United States Patent [19]

Christol

[11] Patent Number: 4,738,158

[45] Date of Patent: Apr. 19, 1988

[54] CYCLE PEDALING DEVICE AND SHOES ADAPTED FOR USE THEREWITH

[76] Inventor: Lilian Christol, 25, boulevard Gambetta, F-34800 Clermont L'Herault, France

[21] Appl. No.: 54,214

[22] Filed: May 21, 1987

Related U.S. Application Data

[63] Continuation of Ser. No. 842,058, Mar. 17, 1986, abandoned, which is a continuation of Ser. No. 491,585, May 4, 1983, abandoned.

[30] Foreign Application Priority Data

May 12, 1982 [FR] France ................................ 82 08222

[51] Int. Cl.⁴ .......................... G05G 1/14; B62M 3/08
[52] U.S. Cl. ...................................... 74/594.6; 74/560; 36/131
[58] Field of Search ................. 74/594.6, 594.4, 594.7, 74/560; 280/613, 615, 59; 36/131, 132, 122; 24/636, 633, 637; 292/257

[56] References Cited

U.S. PATENT DOCUMENTS.

| | | | |
|---|---|---|---|
| 458,608 | 9/1891 | Wheeler | 74/594.6 |
| 553,685 | 1/1896 | Owen | 74/594.6 |
| 583,086 | 5/1897 | Richards | 74/594.6 |
| 598,325 | 2/1898 | McIntyre | 74/594.6 |
| 629,627 | 7/1899 | Tomkies | 74/594.6 |
| 637,900 | 11/1899 | Smith | 36/131 X |
| 2,103,737 | 12/1937 | Tappe | 280/11.3 |
| 2,244,719 | 6/1941 | Mansfield | 280/11.3 |
| 2,580,477 | 1/1952 | Statham | 24/639 |
| 3,775,866 | 12/1973 | Marker | 280/613 |
| 3,960,027 | 6/1976 | Magnuson | 74/594.6 |
| 4,089,236 | 5/1978 | Genzling | 74/560 X |
| 4,646,586 | 3/1987 | Rapisarda | 74/594.6 |

FOREIGN PATENT DOCUMENTS

| | | | |
|---|---|---|---|
| 508948 | 10/1930 | Fed. Rep. of Germany | 280/615 |
| 1308881 | 10/1962 | France | 24/636 |
| 2301193 | 9/1976 | France | 36/131 |
| 2373440 | 8/1978 | France | 74/560 |
| 2432427 | 4/1980 | France | 74/594.6 |
| 2449587 | 9/1980 | France | . |
| 2512770 | 3/1983 | France | . |
| 2515603 | 5/1983 | France | . |
| 18310 | 6/1898 | United Kingdom | 36/131 |
| 1396393 | 6/1975 | United Kingdom | 74/594.6 |

Primary Examiner—Gary L. Smith
Assistant Examiner—Rodney M. Lindsey
Attorney, Agent, or Firm—Browdy and Neimark

[57] ABSTRACT

A pedal and a cyclist shoe with lateral guides and an operable lock on a platform attached to the crank of the pedal and a recess and a groove and/or projection on the sole of the shoe for respective engagement with the guides and lock of the platform.

12 Claims, 4 Drawing Sheets

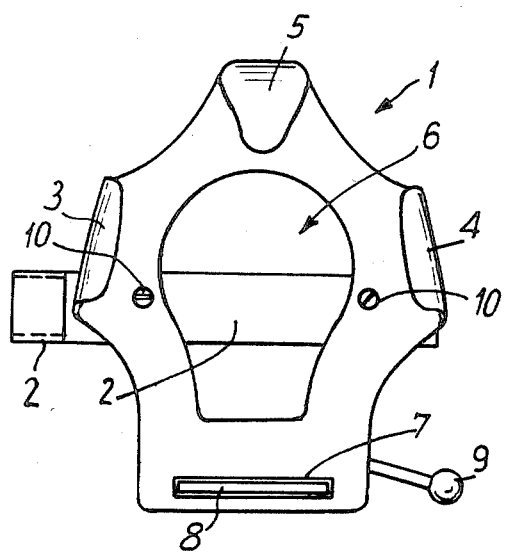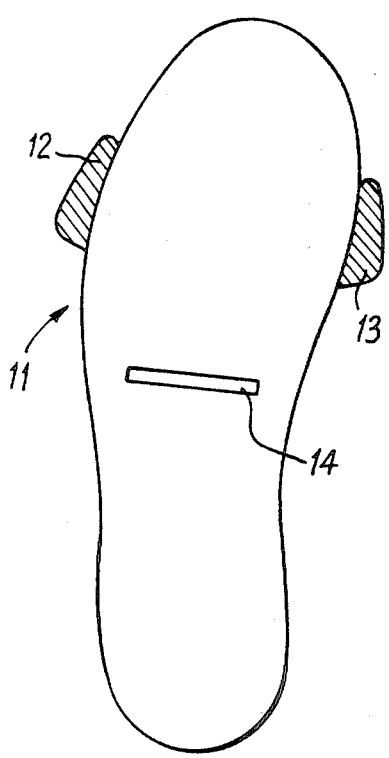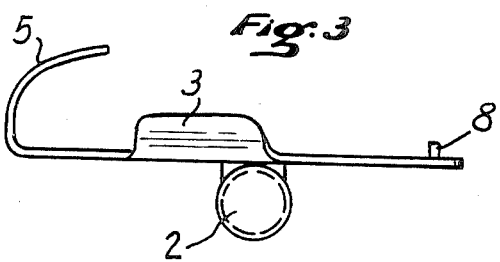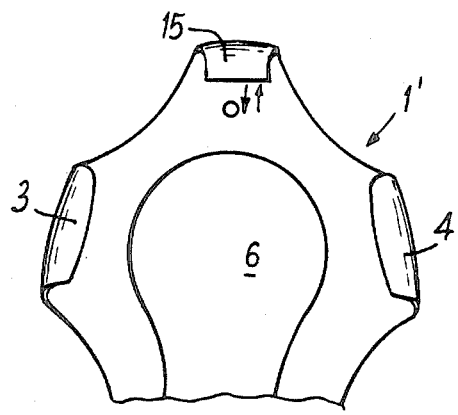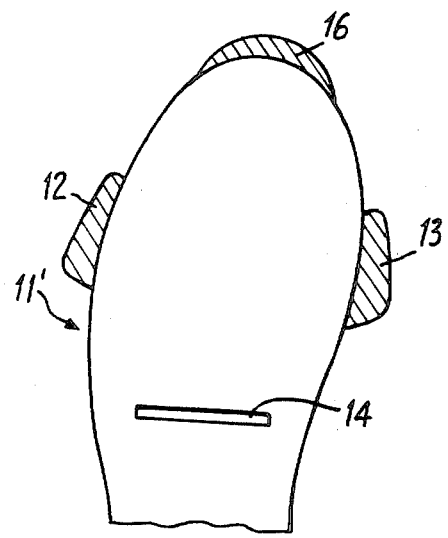

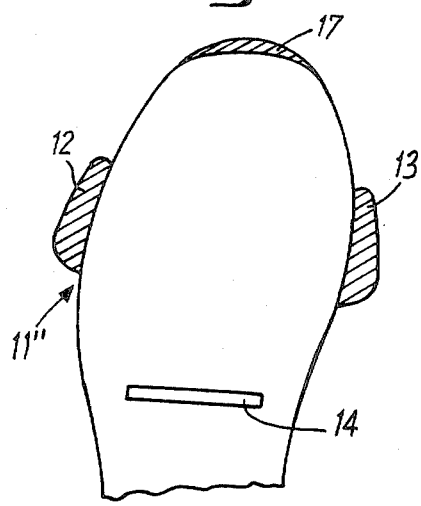
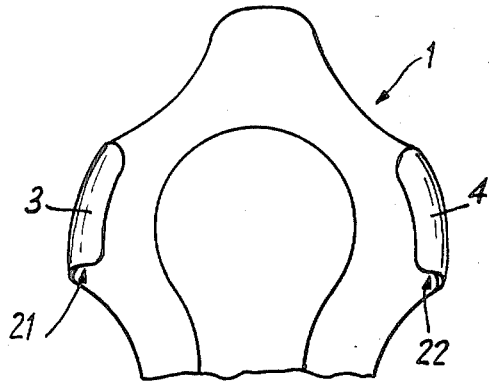
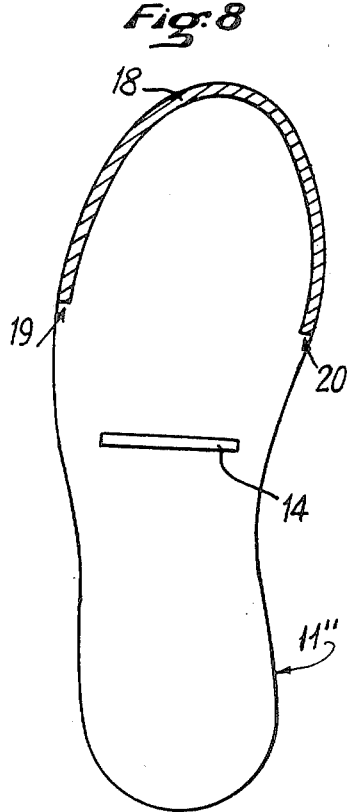
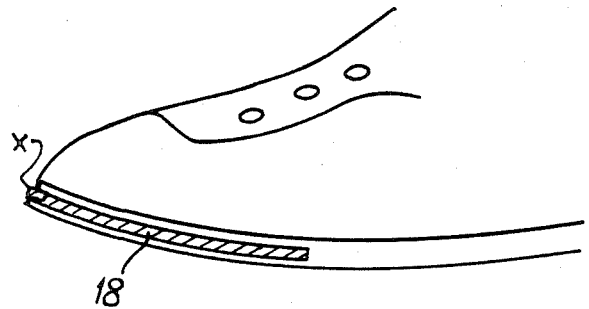
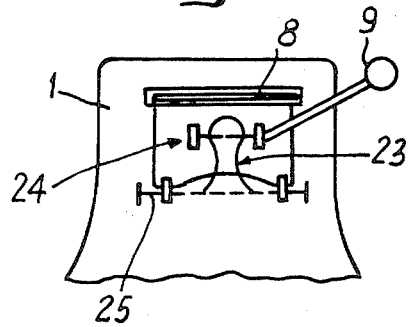

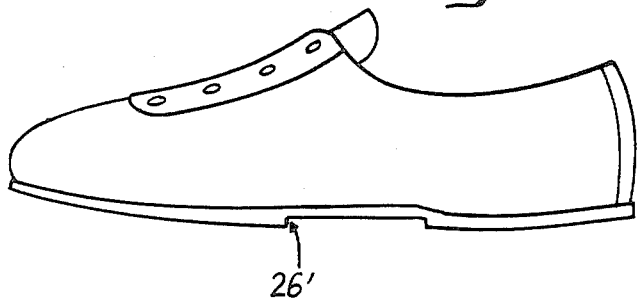
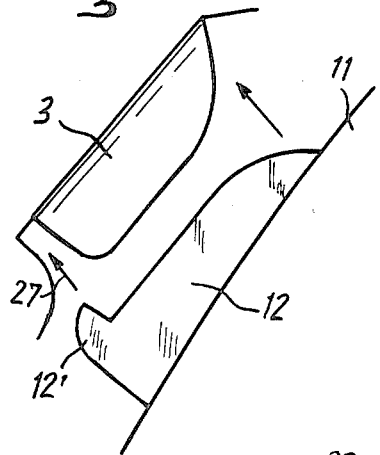
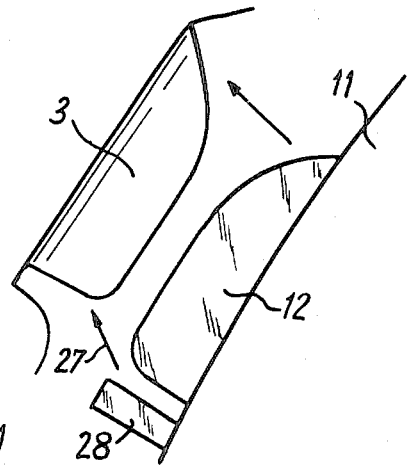
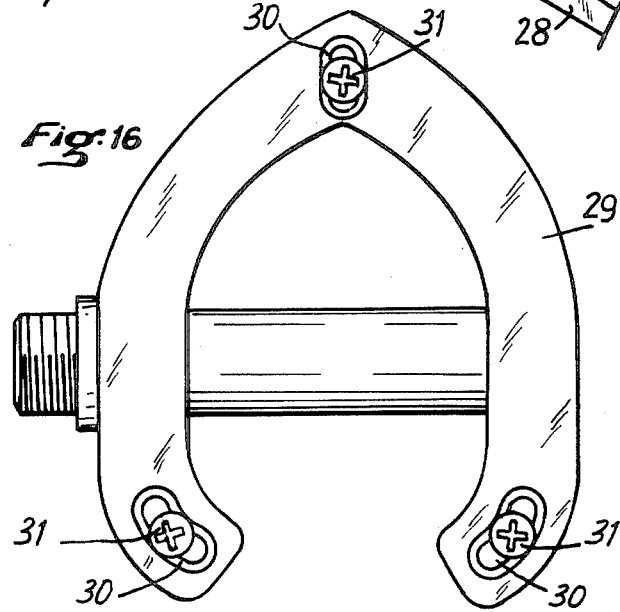

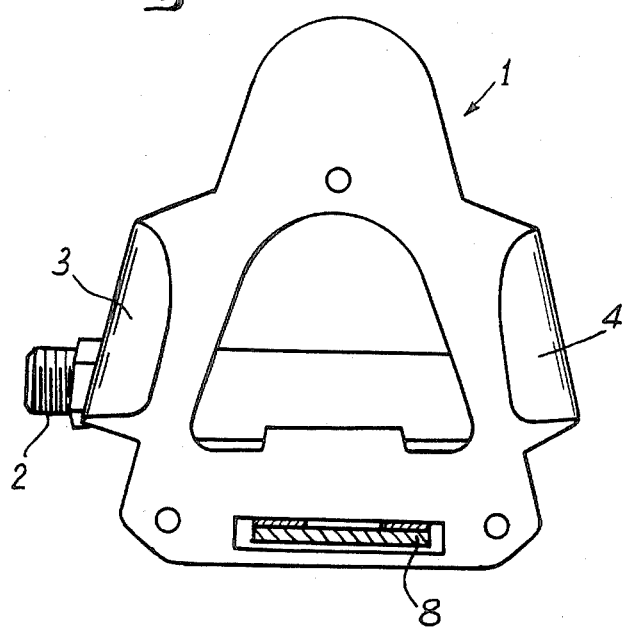
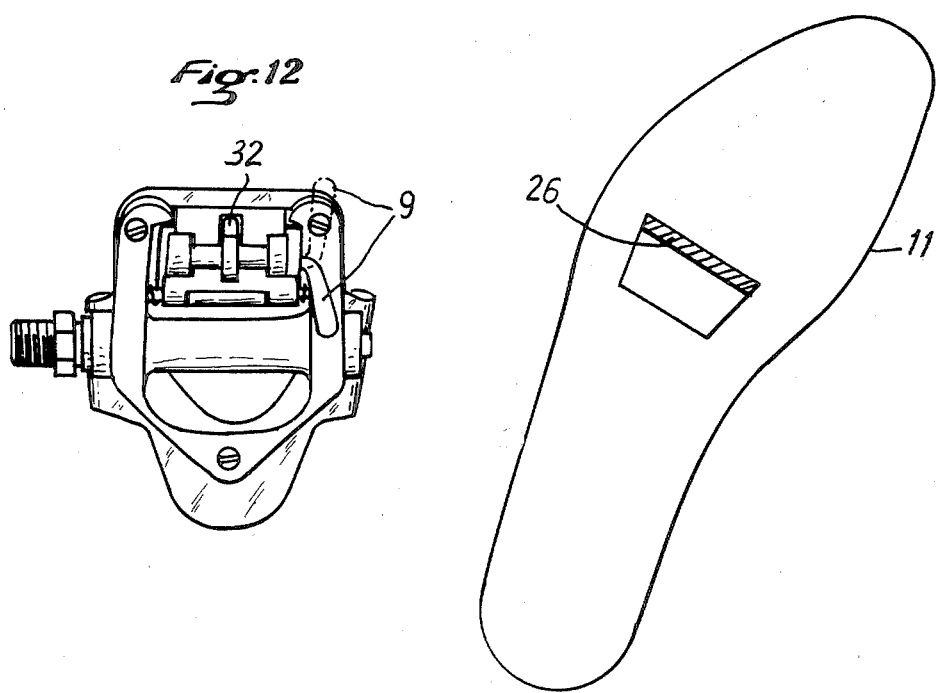

CYCLE PEDALING DEVICE AND SHOES ADAPTED FOR USE THEREWITH

This application is a continuation of application Ser. No. 842,058 filed Mar. 17, 1986, itself a continuation of application Ser. No. 491,585 filed May 4, 1983, now both abandoned.

BACKGROUND OF THE INVENTION

This invention relates to the field of crank gears for cycles and particularly to an assembly including a pedal and a cyclist's shoe having a specially adapted sole.

It is known that to obtain maximum efficiency in crank gears, it is necessary that the pedal toe clip be provided with a strap and the shoe sole be provided with a pedal wedge tthat engages over the back part of the pedal housing. Various embodiments have been proposed to improve the lateral locking positions of the shoe, as for example a pedal with a rear portion having a centrally located cavity (French patent application Nos. 81.17542 and 81.20559).

These improvements, however, have the following disadvantages: (a) the surface of contact between the sole and pedal comprises a very small area of the pedal branches; (b) the tight locking strap of the toe clip is uncomfortable and often dangerous; (c) the shoe cannot be used for walking because of prominence of a pedal wedge under the sole.

It has been proposed to eliminate the toe clip by combining a pedal or pedaling platform having a special structure, as for example lateral slides, with a shoe whose sole is provided either with a female housing element cooperating with a male element on the pedal, or a plate with a projection forming the pedal wedge (see, for example, French Pat. No. 79.04413). However, these systems are complex and use is delicate; further, the device provided under the shoe does not allow normal walking with the latter.

SUMMARY AND OBJECTS OF THE PRESENT INVENTION

The present invention eliminates all the above-mentioned drawbacks by providing a cycle pedaling device that not only makes possible the elimination of the toe clip, strap and pedal wedge, but also provides an efficient, easy to use, comfortable, and reliable assembly considerably superior to those assemblies used to date.

To achieve these and other objects, the invention provides a device for a pedaling unit for a cycle to be used in combination with a shoe, the device comprising a platform having lateral guides for the shoe, the platform cooperating with the pedaling unit and having a shoe retention or locking system. This unit is essentially characterized by the following features:

(a) the lateral guides of the platform which can take the form of a bent over or turned down piece of the platform, have an orientation reentrant toward the front, the platform being provided at its rear with a locking assembly and including a bolt or latch about which the platform is mounted to swivel on its fastening support;

(b) the shoe sole is provided on its lateral faces with engaging means for cooperating with the guides and, on the bottom with a crosswise notch or projecting ridge at least as long as that of the bolt or latch for engaging or locking the latter on the sole. The lateral guides on the platform serve to grip the engaging means on the shoe sole. The bolt or latch moves from a disengaged position below the level of the platform to an engaged position above the level of the platform wherein such bolt or latch engages with the crosswise notch constituting a recess within the sole of the shoe.

The pedaling platform is preferably angularly adjustable on its fastening support, for example, by a screw or similar means, to satisfy pedaling users with a more or less pronounced bias. In practice, the support can consist of a metal plate on which is also fastened the bolt locking assembly and which rests on the pedal shaft. However, it will be noted that this shaft can be eliminated, as in some modern pedals, and that the platform support can be provided for direct engagement on the pedal crank.

According to a first embodiment, the means for housing the shoe sole in the lateral guides of the platform consist of lateral fins or projections on the shoe soles which can be wedged in the guides, and which advantageously can be curved inward or closed in their front part to form stops for the front part of the fins.

According to a variant embodiment, the fins of the shoe sole are replaced, in whole or in part, by a groove or channel which can be made only on the front edge or, preferably, on the entire periphery of the front part of the sole. This groove is intended to engage in the lateral guides of the platform until the ends of the groove strike the back ends of the guides. In this embodiment, which makes it possible to reduce the overall width of the platform and of the shoe and to improve the looks, it is possible to provide a lengthwise adjustment of the front of the platform, with or without a front stop, to meet the desire of the user.

BRIEF DESCRIPTION OF THE DRAWINGS

Numerous other characteristics of the device according to the invention will come out in the following description relating to various nonlimiting examples, illustrated in the drawings, in which:

FIG. 1 is a top view of a platform serving as a pedal according to the invention;

FIG. 2 is a bottom view of cyclist shoe adapted to fit the platform of FIG. 1;

FIG. 3 is a perspective view of a front stop of the platform of FIG. 1;

FIG. 4 illustrates one variation of the platform or pedal of the present invention;

FIGS. 5 and 6 show partial bottom views of shoe soles adapted to fit the platform of FIG. 4;

FIG. 7 shows another variation of the platform of the present invention;

FIGS. 8 and 9 are views of shoe soles designed to engage the platform of FIG. 7;

FIG. 10 illustrates still another variation of the platform of the present invention;

FIGS. 11 and 12 depict bottom views of platforms illustrating the modes of operation of the shoe locking bolt;

FIGS. 13 and 14 illustrate two variations of the shoe sole intended for use with the platform of FIG. 10;

FIGS. 15a and 15b depict the manner of engagement between first and second respective shoe sole designs and one side rail portion of a platform according to the present invention; and FIG. 16 shows a top view of the support of the platform of FIG. 10.

DETAILED DESCRIPTION OF THE INVENTION

Referring first to FIGS. 1-3 and particularly to FIG. 1, the new pedal of the invention consists of a metal plate 1 fastened to a support (not shown here) through or by means of shaft 2 of the pedal or connected directly to the pedal crank. The plate, which can be flat or cambered, is bent over on its lateral faces to form two flaps 3, 4, acting as guides, and comprises on its front part a bent flap 5 forming a stop as well as a protective shield for the shoe. Plate 1 may be designed to provide lengthwise adjustment on the support, depending on the length of the shoe. The platform can include a cutout at 6 and it is provided on its back part with a cutout 7 for the passage therethrough of a bolt 8 that can be manoeuvered by rod 9. Further, plate 1 can be angularly swivelled via its connection with the support and screws 10, 10.

The shoe adapted to fit this pedal comprises a sole 11 of the same shape as the platform (flat or cambered) and is provided on one part with two lateral fins 12 and 13, for insertion into guides 3 and 4. A notch 14 may be provided in sole 11 which is at least as long as bolt 8 of the platform, or at least as deep at the part of the catch or bolt 8 which goes beyond plate 1 in engaged position. This notch, preferably reinforced, is located at a substantial distance from the front edge of the sole (for example, 10.5 cm for size (7½ U.S.), 11.5 cm for size (U.S. inches), etc. On the other hand, regardless of size, the position of fins 12, 13 in relation to notch 14 remains fixed as does the distance between the back ends of the fins and notch, which is equal to the distance between the back ends of lateral guides 3, 4 and bolt 8 of platform 1. Of course, the length and shape of the guides 3, 4 and of fins 12, 13 are adapted for easy placement and removal of the shoe. As seen in FIGS. 1 and 2, the lateral guides and the corresponding fins take on a reentrant shape, like an inverted V, to facilitate and improve the engagement of the shoe on the platform. Moreover, the width of sole 11, from one end of fins 12, 13 to the other, always stays the same regardless of size; at most it is equal to the width of platform 1 at the site of lateral guides 3, 4.

According to the variants of the plate and shoe sole illustrated in FIGS. 4-6, the front stop of platform 1' is replaced by a third flap forming guide 15, also adjustable lengthwise, the length being determined by the placement of the bend or fold. Shoe sole 11' extends forward by a corresponding fin 16. In the shoe sole embodiment of FIG. 6, fin 16 is replaced by a groove 17 made in the front thickness of the sole which is insertable in guide 15. This makes it possible to reduce the total length of the device.

Referring now to FIGS. 7-9, shoe sole 11" comprises only a groove or channel 18, which, instead of being only in the front as in the embodiment of FIG. 6, surrounds the front of the shoe. This groove, which can be reinforced to avoid any shearing phenomenon, engages the two lateral guides 3 and 4 of platform 1", while facilitating withdrawal of this shoe, after use. The groove separates the sole into a lower sole edge and an upper sole edge, it being understood that the lateral guides 3 and 4 wrap around the lower sole edge and project into the groove. Guides 3 and 4 of plate 1" (shown in FIG. 7) have the same, slightly rounded, shape as the edges of the sole. The platform may, in addition, comprise in its front part a stop of type 5 (FIG. 1) or a guide of type 15 (FIG. 4).

Regardless of the size of the shoe, the two ends 19 and 20 of groove 18 always remain at the same distance from notch 14, this notch being the same as that existing between back ends 21 and 22 of guides 3 and 4 and bolt 8; notch 14 always remaining, as in the above case, at a variable distance from the outside edge of the sole depending on the size of the shoe. Moreover, as said above and regardless of the size of the shoe, the width of sole 11 remains standard at the site of the ends 19 and 20 of groove 18, and beyond these points over a length equal to that of guides 3, 4. The insertion of the sole of the shoe is performed by making the ends of grooves 19 and 20 strike edges 21 and 22 of the lateral guides. When this striking is done, bolt 8 is automatically in alignment below and with notch 14.

Referring now to FIGS. 10 and 13-16, the crosswise notch, identified as 14 above in reference to FIGS. 2, 5, 6 and 8, is replaced by an element having projecting ridge 26 (see FIG. 13) against the edge of which is jammed bolt 8 of the assembly used for locking the shoe on the platform. According to the embodiment of shoe sole shown in FIG. 14, ridge 26', instead of being housed in the sole, consists of a cutout of the sole on part or all the width of this latter. This replacement of the notch with a projecting element makes it possible to avoid any obstruction, by the ground or travel, of the contact-stop zone of the locking bolt.

According to another embodiment of the invention, where sole 11 is provided with fins or lateral projections 12, the lower part of the fins is advantageously provided with a shoulder 12' extending outwardly from the fin and away from the sole which makes it possible for the fin to strike the lower end of guide 3, as shown by arrow 27 in FIG. 15a. In another embodiment, illustrated in FIG. 15b, a stop or lug 28 is provided independent of fin 12, and comprises an integral part of shoe sole 11.

Where the sole is provided with lateral fins, it is also advantageous to provide for the front of the fins to strike the front inside part of the lateral guides of the platform. Accomplishing this requires only that the front part curve inward or even completely close this part of the guides.

According to another advantageous characteristic of the invention, (see FIG. 16) platform 1 may be made adjustable in all directions and in particular angularly on the support 29 connected to the pedal crank. To this end, support 29 is provided with bean-shaped buttonhole-type openings 30 which enable fastening screws 31 of the platform to be put in place depending on the position desired for the platform.

FIGS. 11 and 12 show views of the platform in a simplified manner to illustrate the modes of locking and releasing bolt 8. In FIG. 11, rod 9 operates a spring 23 mounted between two shafts 24, 25 of which the latter is solid with the platform support. In FIG. 12, the rod or handle 9 (down for locking, up for unlocking, the latter being the position denoted in broken lines) has on its shaft a crank pin 32 whose shape with rounded or cutoff corners enables locking bolt 8 to come out by shoving or retract by loosening.

It will be noted that this locking assembly can either be located completely at the back of the platform or in the middle of this back part (in the embodiments described above), and the ridge or notch of the shoe sole can be located at the same or corresponding site as the back part of the projection of the sole (or the end of the grooves), if the bolt and back end of the guides are also in the same line. In any case, the distance between a perpendicular line passing through the notch or ridge of the sole and an imaginary line joining the two end points of the latter, where striking of the guides occurs, is fixed, regardless of the shoe's size and is equal to the distance of a perpendicular line going through the bolt and an imaginary line joining the two platform guides, at the site where they strike the sole.

The user, after having angularly adjusted platform 1 on its support 29, engages his shoe on the platform by fitting the fins or grooves of the sole in the pedal guides; at the end of the travel, locking is performed by engaging bolt 8 in notch or ridge 26; otherwise, it suffices to operate handle 9 provided for this purpose.

Thanks to the device according to the invention, the four phases of pedaling; thrust forward, bearing down, pushing back and rising, are effectively performed, support of the shoe being achieved perfectly by the complete contact of the sole with the platform unit. It will be noted that the pushing back phase is accomplished with maximum efficiency by engagement of bolt 8 in notch 14 or against ridge 16 of the sole. In case the cyclist falls and thereafter cannot perform manual unlocking, this unlocking will be done automatically by contact of handle 9 with the ground, the rod of this handle being inclined toward the rear and terminating in a small knob to facilitate this contact.

Numerous tests have confirmed the superiority in all aspects, of the system according to the invention, over other pedaling devices that are already known. Actually, placing the foot on the platform is fast, and pedaling efficiency is surprisingly increased primarily as a result of: (a) the perfect contact of the sole with the platform, (b) lowering of the support points which are exerted totally close to the pedal shaft (or the engagement device on the crank), and (c) the relaxation of the foot which no longer experiences the grip or the toe clip and associated belt. Moreover, the comfort is perfect and the reliability of the system is certain. Finally, walking with the cyclist shoe of the invention is made possible by the absence of the pedal wedge.

Another variant contemplates the guides being added to the platform instead of constituting the flaps of the latter. In this case, they can be angularly adjusted by swiveling, the bolt then having an elliptical shape to allow the sole to follow the orientation given by the guides.

It is important to note that, as a result of their shape, the guides perform the function of guiding when putting the shoe on the platform. Further, the means for lateral fitting of the sole (fins or grooves) can thus be easily wedged in the guides; this wedging works with the forward thrust during pedaling and, further, makes it possible, when the sole locking apparatus is in locked position, to continue a pedal without risk of involuntary removal of the shoe.

What is claimed is:

1. A pedaling unit for a cycle comprising an interlockable shoe and a platform fastened to the pedal crank of the cycle, the improvement comprising:
    said shoe having a sole with a substantially flat bottom surface both for engagement with said platform in a cycling mode and for walking without discomfort in a walking mode, said sole having a front end in a generally semi-circular configuration, said sole further having a width-wise extended recess therein passing upwardly from said flat platform engaging surface and located rearwardly of said generally semi-circular front end; and
    said platform having lateral guides and a locking assembly, both for retaining said shoe thereon, said lateral guides constituting means for gripping and retaining said sole on said platform, said guides of said platform having a re-entrant orientation toward the front in the form of a reversed V;
    said platform further including a latch elevatible from below the upper surface of said platform to above the upper surface of said platform for engagement within the upwardly extending recess in said sole flat bottom surface for maintaining said sole in its length-wise direction in engagement with said platform guides, said latch having a length no greater than the length of the upwardly extending recess in said sole, and said latch being located in a rear portion of said platform; and
    control means to effect upward movement of said latch into engagement within said recess and downward movement of said latch from said recess for disengagement.

2. A pedaling unit according to claim 1 wherein said control means includes a manually operable handle means coupled with said latch, said handle means being pivotably supported by said platform for movement between engagement and disengagement.

3. The improvement of claim 1 wherein
    said shoe comprises fins extending laterally from said sole sides, and
    said platform lateral guides comprise means for wedgingly receiving said fins.

4. The improvement of claim 3 wherein
    said fins and said guides are complementarily configured, said guides being disposed on lateral sides of said platform with an re-entrant orientation toward the front.

5. A pedaling unit according to claim 1 further comprising a front guide on said platform for receiving and surrounding the forward portion of said sole.

6. The improvement of claim 1 wherein
    said platform is mounted on a support attached to said pedal crank, and said support comprising means for adjusting the orientation of said platform relative to said pedal crank.

7. The improvement of claim 1 wherein said lateral guides comprise means, at their forward ends, for stopping forward insertion of said shoe and said shoe comprises projecting means insertable in the lateral guides and shoulder means to limit insertion of said shoe in said lateral guides.

8. The improvement of claim 7 wherein
    said projecting means comprise fins extending laterally from said sole, and said shoulder means comprise a lug separate from, and disposed adjacent to, said fins.

9. The improvement of claim 1 wherein said shoe recess comprises a cutout defining a ridge projecting upwardly from the platform engaging surface of said sole.

10. The improvment of claim 9 wherein
    said locking assembly includes manually operable handle means, said handle means being pivotably supported by said platform for movement between a first position in which said bolt means is positioned below the upper surface of said platform and a second position in which said bolt is positioned above said upper surface of said platform, said handle being biased to one of its first or second positions.

11. The improvement of claim 10 wherein said locking assembly further includes crank pin means, associated with said bolt means, for raising said bolt means above said platform upper surface.

12. A pedalling unit for a cycle comprising an interlockable shoe and a platform fastened to the pedal crank of the cycle, the improvement comprising:

said shoe having a sole with a substantially flat bottom surface both for engagement with said platform in a cycling mode and for walking without discomfort in a walking mode, said sole having a front end in a generally semi-circular configuration, said generally semi-circular front end of said sole having a groove therein extending inwardly and generally in the semi-circular shape of the front end of said sole, so as to define a lower sole edge and an upper sole edge, said sole further having a width-wise extended recess therein passing upwardly from said flat platform engaging surface and located rearwardly of said generally semicircular front end; and said platform having lateral guides and a locking assembly, both for retaining said shoe thereon, said lateral guides engaging in said generally semicircular groove in the sole of said shoe, a portion of said lower sole edge lying below said generally semi-circular groove projecting into said lateral guides at least along sides of said sole, said guides of said platform having a re-entrant orientation towards the front in the form of a reversed V;

said platform further including a latch elevatible from below the upper surface of said platform to above the upper surface of said platform for engagement within the upwardly extending recess in said sole flat bottom surface for maintaining said sole in its lengthwise direction in engagement with said platform guides, said latch having a length no greater than the length of the upwardly extending recess in said sole, and said latch being located in a rear portion of said platform; and said platform further comprising control means to effect upward movement of said latch into engagement within said recess and downward movement of said latch from said recess for disengagement.

* * * * *